United States Patent
Eichstadt et al.

(10) Patent No.: US 10,562,638 B2
(45) Date of Patent: Feb. 18, 2020

(54) CRADLE FOR A TURBOPROPELLER ENGINE WITH INTEGRATED AIR INLET DUCT

(71) Applicant: SAFRAN AIRCRAFT ENGINES, Paris (FR)

(72) Inventors: Frederic Paul Eichstadt, Moissy-Cramayel (FR); Nora El Ghannam, Moissy-Cramayel (FR); Romain Jean-Claude Ferrier, Moissy-Cramayel (FR); Antoine Elie Hellegouarch, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/320,264

(22) PCT Filed: Jul. 20, 2017

(86) PCT No.: PCT/FR2017/052002
§ 371 (c)(1),
(2) Date: Jan. 24, 2019

(87) PCT Pub. No.: WO2018/020112
PCT Pub. Date: Feb. 1, 2018

(65) Prior Publication Data
US 2019/0270524 A1    Sep. 5, 2019

(30) Foreign Application Priority Data

Jul. 25, 2016 (FR) .................................. 16 57123

(51) Int. Cl.
*B64D 27/26* (2006.01)
*B64D 27/12* (2006.01)
*B64D 33/02* (2006.01)

(52) U.S. Cl.
CPC .............. *B64D 27/12* (2013.01); *B64D 33/02* (2013.01); *B64D 2027/264* (2013.01); *B64D 2033/0293* (2013.01)

(58) Field of Classification Search
CPC ... B64D 2027/264; B64D 27/12; B64D 27/14
See application file for complete search history.

(56) References Cited

U.S. PATENT DOCUMENTS 4,456,458 A * 6/1984 Gilbertson ............. B01D 45/04
244/53 B
5,725,180 A  3/1998 Chamay et al.
(Continued)

FOREIGN PATENT DOCUMENTS

EP   1538080 A1   6/2005
WO   2008/103735 A2   8/2008

OTHER PUBLICATIONS

International Search Report and Written Opinion for PCT Patent Application No. PCT/FR2017/052002, dated Oct. 10, 2017, 16 pages (7 pages of English Translation and 9 pages of Original Document).

*Primary Examiner* — Jessica B Wong
(74) *Attorney, Agent, or Firm* — Woble Bond Dickinson (US) LLP

(57) ABSTRACT

The invention relates to a cradle (10) for an aircraft turbopropeller engine (12) of a substantially axial orientation, comprising a front arch (16) and a rear arch (18) extending transversely relative to said axial direction (A), said arches (16, 18) being open at their lower ends and connected to each other by at least one axial longeron (34) extending between said arches (16, 18), characterised in that the longeron (34) is arranged in an upper portion of the cradle (10) and is formed in a single piece with the front arch (16).

10 Claims, 3 Drawing Sheets

(56) References Cited

U.S. PATENT DOCUMENTS

| | | | |
|---|---|---|---|
| 2005/0116093 A1* | 6/2005 | Machado | B64D 27/12 244/54 |
| 2008/0067286 A1* | 3/2008 | Cousin | B64D 27/12 244/54 |
| 2010/0132378 A1* | 6/2010 | Marche | B64D 27/12 60/797 |
| 2011/0174918 A1 | 7/2011 | Lebas et al. | |
| 2014/0130512 A1* | 5/2014 | Chouard | B64D 27/14 60/797 |
| 2015/0251768 A1 | 9/2015 | Woolley et al. | |

* cited by examiner

CRADLE FOR A TURBOPROPELLER ENGINE WITH INTEGRATED AIR INLET DUCT

TECHNICAL FIELD OF THE INVENTION

The present invention relates to the attachment of power units on aircraft. It relates more specifically to a cradle for the fastening or suspension of a turbopropeller engine under the wing of an aircraft.

STATE OF THE ART

A turbopropeller engine is conventionally suspended from the wing of an aircraft by means of a cradle, which must meet several criteria.

Such a cradle is located in the direction of air flow when the aircraft is moving, and in particular in the air current generated by the propeller driven by said turbopropeller engine. For this reason, the cradle must have small dimensions around the turbopropeller engine to minimise the obstacle created by the turbopropeller engine for the air flows, be it the air flows caused by the movement of the aircraft, or the air flows generated by the propeller of the turbopropeller engine.

Such a cradle must also make it possible for the transmission to the wing of the static and dynamic forces generated by the turbopropeller engine, such as the weight, the thrust and the take-up torque of the turbopropeller engine, or more generally the various dynamic forces to which the turbopropeller engine subjects the wing during operations. For these reasons, the cradle must have high rigidity properties.

Furthermore, such a cradle must be provided with various volumes intended to receive different members, accessories or equipment allowing the functioning of the turbopropeller engine, such as described in documents EP-1.538.080-A1, WO-2008/103.735-A2, US-2015/251.768-A1 and US-2011/174.918-A1.

For example, such a cradle must be able to integrate an air inlet duct intended to make it possible for the supply of fresh air to a gas turbine of the turbopropeller engine, and a pipe connected to this air inlet duct which allows to rid the fresh air being suctioned of any impurities and/or foreign bodies that it could contain, to prevent them from being introduced in the gas turbine of the turbopropeller engine.

This type of cradle is disclosed in document U.S. Pat. No. 5,725,180 A.

The cradle must also house various equipment of the turbopropeller engine, such as, for example, a computer and an accessory gear box (AGB) comprising in particular an alternator and a starter of the turbopropeller engine.

FIG. 1 shows a turbopropeller engine 12 supported by a cradle 10 manufactured according to the state of the art, said cradle being attached under the wing 14 of an aircraft. The cradle 10 comprises, for example, two front and rear arches 16, 18, open at the lower ends thereof and having in particular an inverted U-shape, connected to one another by a truss 20. The cradle comprises in particular upper rods 22 and lower rods 24. The cradle 10 surrounds the turbopropeller engine 12 while leaving the lower portion thereof relatively free, for the maintenance or disassembly thereof.

In the lower portion thereof, the cradle 10 houses an air inlet duct 26, the intake 28 of which is visible behind a propeller 30 of the turbopropeller engine. The air inlet duct 26 extends longitudinally at least partially under the turbopropeller engine 12. A pipe forming a particulate trap (not visible in FIG. 1), which allows to collect impurities and foreign bodies suctioned in by the air inlet duct from the turbopropeller engine and evacuating them in the air flow surrounding the turbopropeller engine during the forward motion of the aircraft, is conventionally connected to the air inlet duct, and also extends under the turbopropeller engine 12.

At the front of the front arch 16, the cradle 10 houses a reduction gear 31 surmounted by an accessory gear box AGB 32. Finally, a computer (not shown) can also be installed in the upper portion of the cradle 10.

According to this design, the air inlet duct 26 and the particulate trap, which are necessary to the functioning of the turbopropeller engine 12, extend underneath the turbopropeller engine 12. These pipes, located underneath the turbopropeller engine 12, limit the space available for other equipment, members or accessories under the turbopropeller engine, which are therefore arranged in the upper portion of the cradle 10, as is the case for the AGB 32, FIG. 2 shows more specifically the installation of the reduction gear 31 and of the AGB 32. In this figure, the axis B of the propeller 30 at the output of the reduction gear 31 is offset above the axis A of the turbopropeller engine, and the accessory gear box 32 is arranged substantially above the casing of the reduction gear 31. Other accessories or equipment (not visible in FIG. 2) can also be installed there. This installation is however not optimal, as it is located in an area of high temperatures of the turbopropeller engine, the air heated by the turbopropeller engine during operations being maintained in the upper portion of the cradle 10 by an aircraft nacelle 33 that streamlines the cradle 10, although it would be preferable for these accessories to be installed in the lower portion of the cradle, where they would be better cooled.

Furthermore, according to this design, it cannot be considered to reduce the number of rods or trusses of rods 20 because, in this case, the cradle 10 would no longer have the rigidity required for the take-up of static and dynamic forces exerted by the turbopropeller engine 12.

Another major disadvantage of this design resides in the arrangement of the air inlet duct 26 and the particulate trap under the turbopropeller engine 12, which complicates maintenance operations of the turbopropeller engine 12. Indeed, conventionally, the air inlet duct 26 and the particulate trap are supported by a shared support called "boat", which is located under the turbopropeller engine 12 and has an elevated weight and size. When it is necessary to access the turbopropeller engine 12, for example to work on one of the constituting components thereof, such as a compressor or a turbine, through an access latch, this boat first needs to be disassembled and removed before being able to gain access to the turbopropeller engine 12. The same is true when the turbopropeller engine 12 must be removed.

Furthermore, during operation, this design also leads the air inlet duct 26, because of its location in the lower portion of the cradle 10 as shown in FIG. 2, to absorb a large amount of foreign bodies or large quantities of water, in particular during taxiing and/or take-off situations of the aircraft, as the air inlet duct 26 is arranged close to the ground, where it is more likely to absorb foreign bodies and water from the surface of the ground. This position increases the probability of absorbing foreign bodies or water by the turbopropeller engine 12, because the particulate trap cannot, by design, filter all of the foreign bodies or water suctioned in by the air inlet duct 26.

Consequently, there is a need for a cradle 10 with a different design, allowing on the one hand, to position the accessories and equipment of the turbopropeller engine 12, such as the AGB 32, in a low position in order to improve the cooling thereof and to facilitate access to the turbopropeller engine 12, and on the other hand allowing to place the air inlet duct 26 in a high position in order to facilitate access to the turbopropeller engine 12 and to reduce the risk of absorption of foreign bodies and/or water by the latter.

Document EP-1.538-080-B1 describes and shows a cradle for an aircraft turbopropeller engine oriented substantially in an axial direction, specifically designed for the suspension of high power engines able to generate high take-up torques on the cradles that support them. The cradle described in this document comprises a front arch and a rear arch that extend transversally with respect to said axial direction, connected to one another by at least one truss of lateral rods and by an upper chamber that improves the rigidity of the cradle, and extending axially between the arches. The chamber is partitioned to have the greatest rigidity, in addition to the truss of rods.

This design does not overcome the issue of the positioning of the accessories and equipment of the turbopropeller engine 12 in the cradle, since the cradle comprises, on the one hand, a chamber that is partitioned and can therefore not be used for any other purpose and occupies a significant space that is completely lost, and because, on the other hand, the cradle still comprises a significant number of lateral rods that hinder the installation of members and accessories, and therefore are not conducive to freeing up additional space for members and accessories of the engine.

SUMMARY OF THE INVENTION

The invention overcomes the abovementioned disadvantages by proposing a new design for a highly rigid cradle, wherein a significant volume is freed under the turbopropeller engine to facilitate access thereto, and enabling increasing the distance between the air inlet duct and the ground, in order to limit the absorption of foreign bodies by the turbopropeller engine.

For this purpose, the invention proposes a cradle for the turbopropeller engine of an aircraft oriented in a substantially radial direction, comprising a front arch and a rear arch extending transversally with respect to said axial direction, said arches being open at the lower ends thereof and connected to one another by at least one axial longeron that extends between said arches, characterised in that the longeron is arranged in the upper portion of the cradle and in that it is formed of one single part with the front arch and with at least one tubular section configured to define an air inlet duct of said turbopropeller engine.

Such a longeron allows to contribute significantly to the rigidity of the cradle, which allows, together with "structuring" hoods used to close the cradle and providing a structural rigidifying function, to limit the number of rods in the cradle, in particular in the lower position.

Moving the air inlet duct to a high position frees zones of the cradle located under the turbopropeller engine and vacates the space previously occupied by the air inlet duct, which can be used to arrange accessories and equipment that are easy to disassemble, this arrangement further facilitating access underneath the turbopropeller engine, for example for maintenance or disassembly purposes.

According to other characteristics of the invention:
 the longeron is further formed of one single part with at least part of the pipe forming the particulate trap,
 the tube section comprises an air inlet that substantially opens onto a transversal plane of said front arch,
 the tube section comprises an air outlet that substantially opens inside said cradle in a plane substantially perpendicular to the air inlet plane,
 the cradle comprises two lateral rods secured on either side of the upper portions of said arches, exclusive of any other rod,
 the pipe forming the particulate trap comprises a front end that opens into the tube section and a tubular and right-angled rear end, oriented outwards from the cradle and oriented along a substantially horizontal axis,
 furthermore, the cradle comprises two longitudinal lateral walls, formed of one single part with the longeron, these walls extending towards the rear from the front arch and running along the entire length of the longeron,
 free longitudinal edges of the longitudinal lateral walls are configured to receive hinges for the lateral protection hoods of the turbopropeller engine.

The invention also proposes a propulsion unit for an aircraft, comprising a turbopropeller engine secured to a cradle of the type described previously.

According to a characteristic of this propulsion unit, the turbopropeller engine comprises a reduction gear that extends at the front of the front arch of said cradle and under the air inlet of the tube section. The turbopropeller engine also comprises an air intake, secured to the air inlet, and at least one item of equipment of the turbopropeller engine, secured under said turbopropeller engine. Furthermore, this propulsion unit comprises two beetle-wing hoods, each hinged on an edge of the longitudinal side walls of the cradle, which are joined in a closed position along a longitudinal line arranged under the cradle. Such beetle-wing hoods, articulated along two close or similar parallel axes like the forewings of a beetle, are well-known from the state of the art.

According to another characteristic of this propulsion unit, the beetle-wing hoods are structural hoods that contribute to rigidifying said turbopropeller engine.

BRIEF DESCRIPTION OF THE FIGURES

The invention will be better understood, and other details, characteristics and advantages of the present invention will become clearer upon reading the following description, provided as an example and not limited thereto, and with reference to the appended drawings, wherein.

DESCRIPTION OF AN EMBODIMENT OF THE INVENTION

Figure 4:
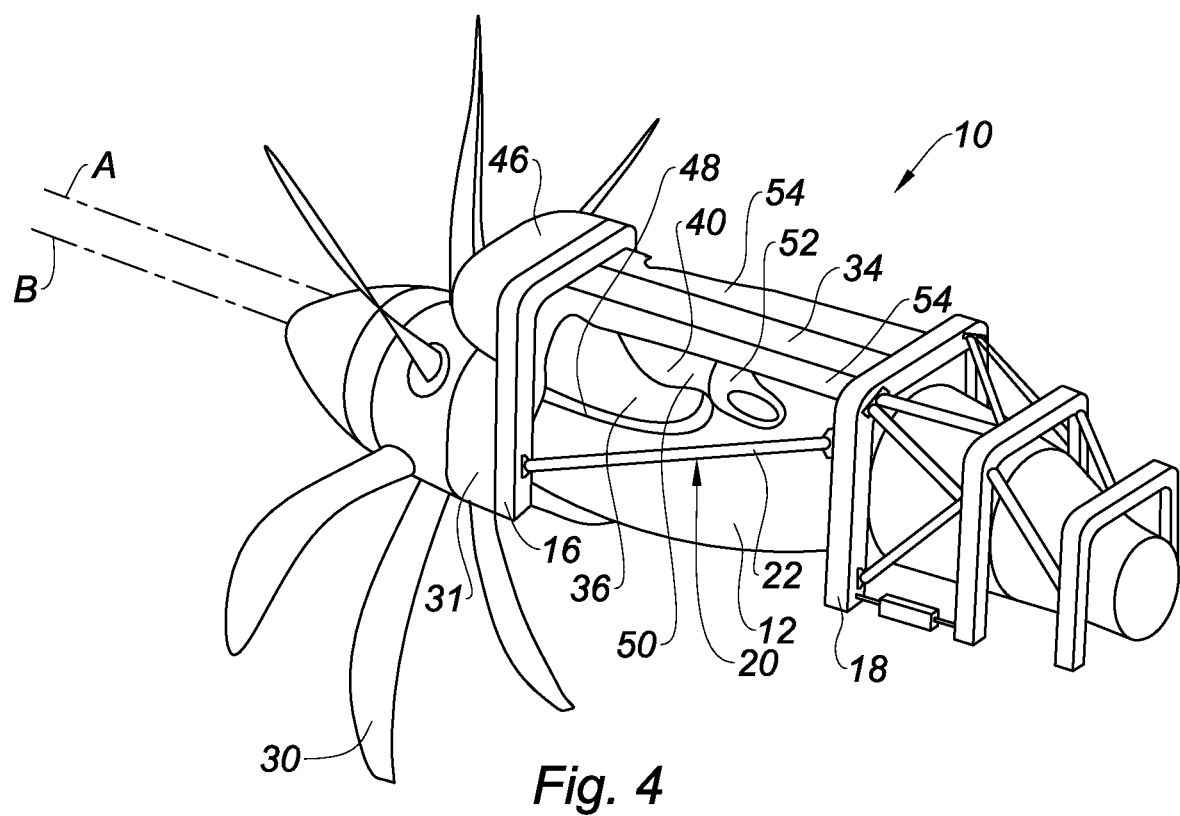
FIG. 4 is a schematic perspective view of a turbopropeller engine received in the cradle manufactured according to the invention.

As shown in FIG. 4, the cradle 10 according to the invention comprises, similarly to the cradles known from the state of the art, a front arch 16 and a rear arch 18 open at the lower ends thereof and having in particular the shape of an inverted U, extending axially with respect to said axial direction A of the turbopropeller engine 12. The arches 16, 18 are connected by a truss 20 of rods.

As is already known from the state of the art, the front 16 and rear 18 arches are connected by at least one axial longeron 34 extending between said arches 16, 18.

According to the invention, the longeron 34 is advantageously arranged in the upper portion of the cradle and is formed of one single part with the front arch 16. This type of longeron significantly contributes to the rigidity of the cradle.

In addition, the longeron 34 is advantageously formed of one single part with at least one tubular section 36 configured to define an air inlet duct 28 of said turbopropeller engine.

Figure 6:
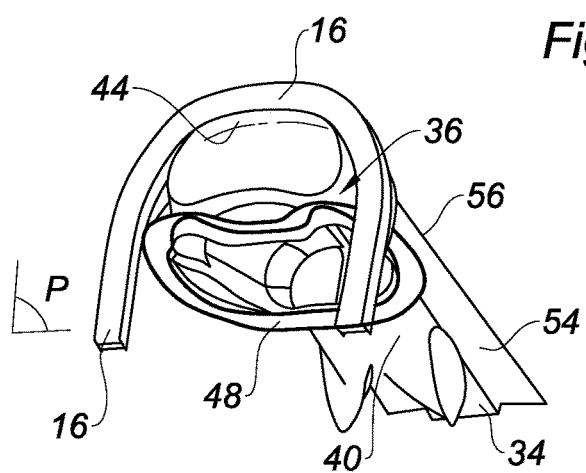
FIGS. 6 to 8 are perspective views of a single-block unit comprising the upper longeron, the front arch, the tube section of the air inlet duct, and the particulate trap implemented in a cradle according to the invention.
Figure 7:
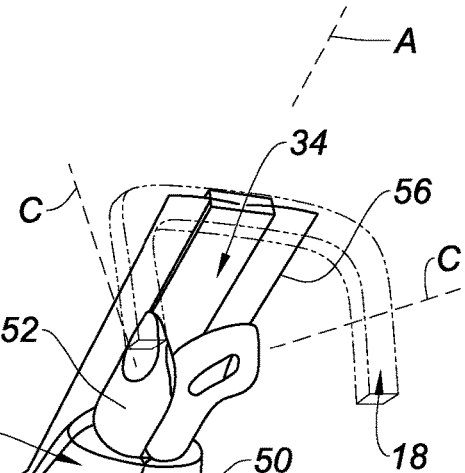
Figure 8:
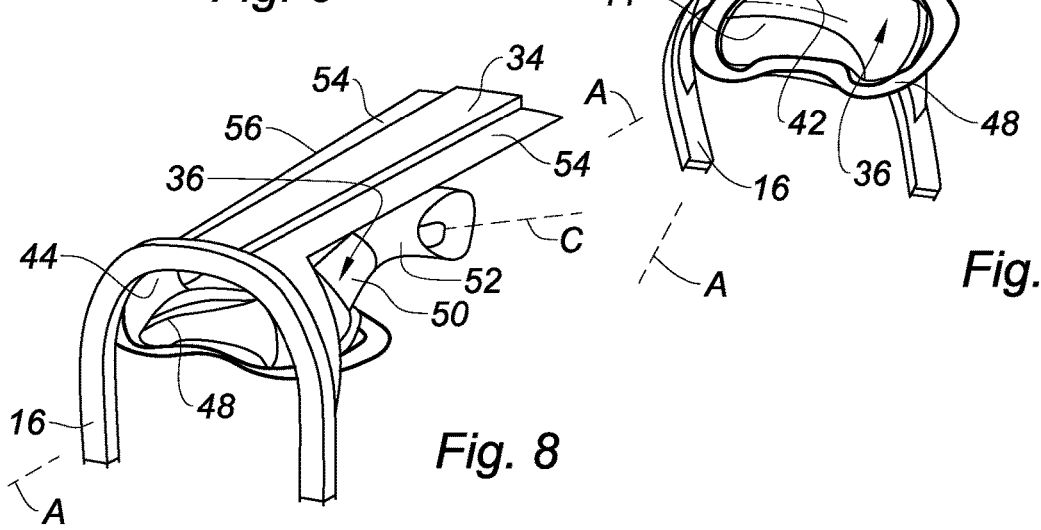

This configuration is more specifically shown in FIGS. 6 to 8.

In the preferred embodiment of the invention, the tube section 36 does not define the entire air inlet duct 26, but only part thereof, as will be seen below in the present description.

Thus, the cradle 10 comprises one single and same part forming, as a minimum, the front arch 16, the longeron 34 and the tube section 36. This part can be produced by the moulding of a metallic material, or by means of mechanically welded construction. The rear arch 18 is provided on this unit, and more particularly at the rear of the longeron 34, as shown in FIG. 4. The truss 20 of rods is then provided on the cradle 10 so as to be secured, on the one hand, to the rear arch 18, and on the other hand, to the unit made of the longeron 34 the front arch 16 and the tube section 36.

Advantageously, the longeron 34 is further formed of one single part with at least one part of the pipe 40 forming the particulate trap.

As shown in FIGS. 6 to 8, the tube section 36 is preferably arranged under the longeron 34. When the unit formed of the longeron 34, the front arch 16 and the tube section 36 is made by moulding, an inner wall 42 of the tube section 36 is joined to a front portion of the longeron 34.

As shown in FIG. 6, the tube section 36 comprises an air inlet 44 that substantially opens onto a transversal plane P of said front arch 16. Moreover, in the preferred embodiment of the invention, each arch 16, 18 has the shape of an inverted U, in order to enable a higher extraction of the turbopropeller engine 12 by lowering it from the cradle 10. Therefore, the air inlet 44 can preferably be arranged in a concave recess of the front arch 16, by form-fitting.

It will be noted that the invention is not limited to this configuration, and that the air inlet 44 could also not be form-fitted with the concave recess of the front arch 16, or open onto a front face of a transversal arm of the front arch 16.

Figure 1:
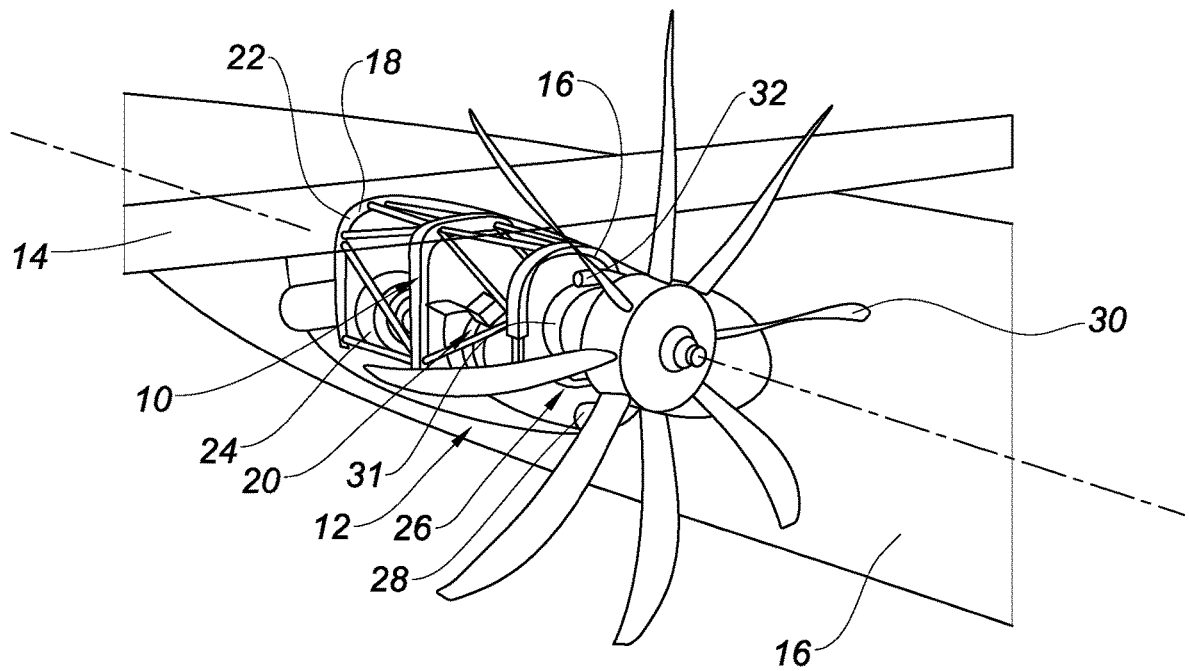
FIG. 1 (already discussed) is a perspective view of a cradle according to the prior art attached under the wing of an aircraft and receiving a turbopropeller engine.
Figure 2:
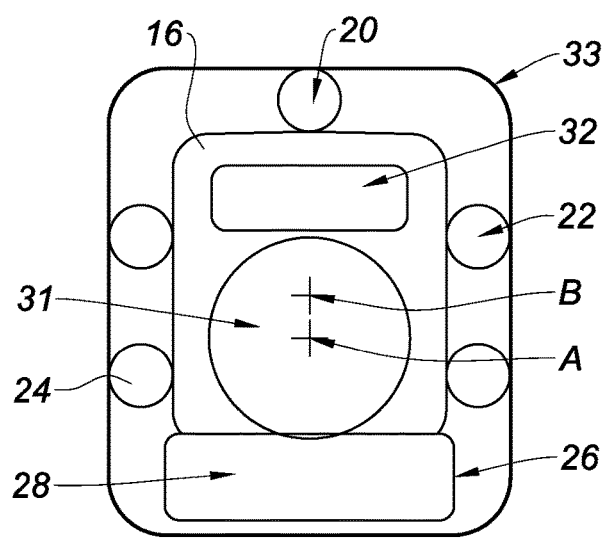
FIG. 2 (already discussed) is a schematic transversal cross-sectional view of the cradle and turbopropeller engine of FIG. 1.
Figure 3:
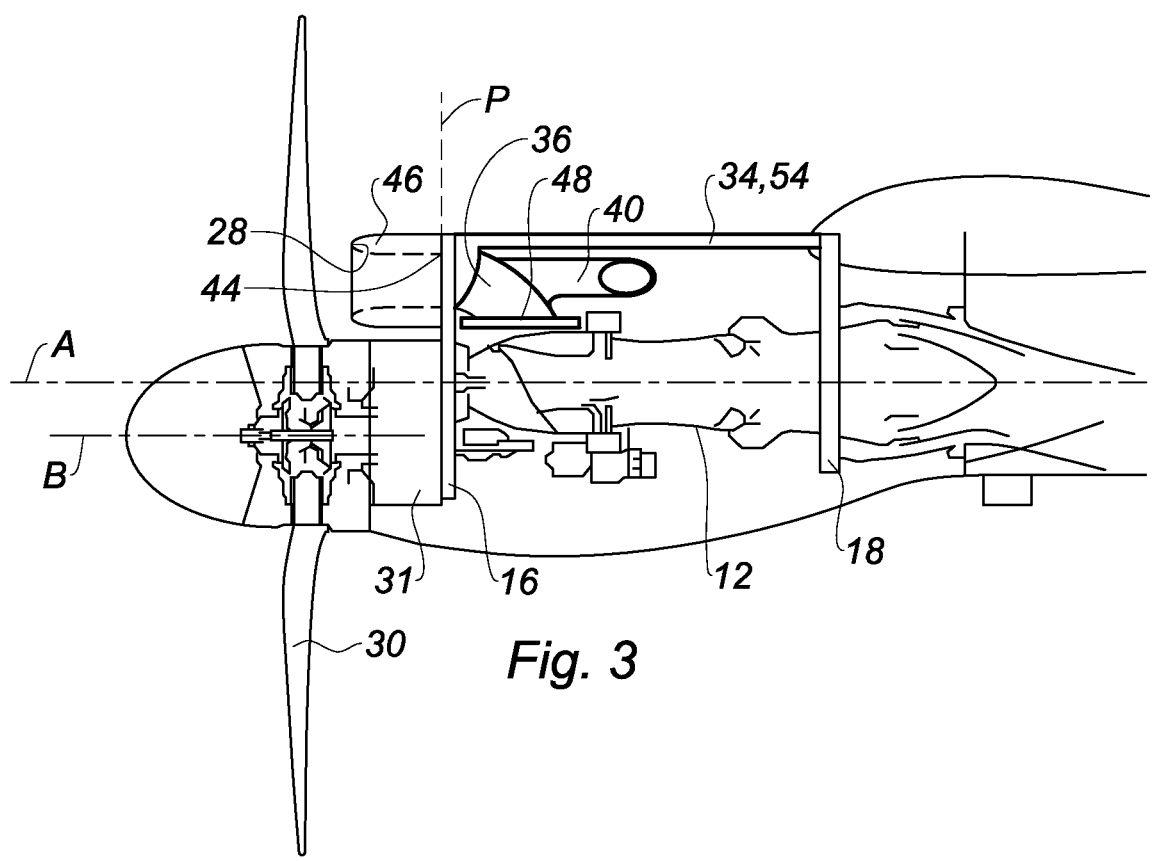
FIG. 3 is a schematic cross-sectional view, along a transversal plane, of a turbopropeller engine received in a cradle manufactured according to the invention.

As has been seen, the tube section 36 does not form the entire air inlet duct 26. As shown in FIG. 3, an air supply 46 comprising, at the end thereof an air intake 28, is provided on the front of the front arch 16, so as to coincide with the inlet 44 and to be interposed axially between this arch 16 and the propeller 30 of the turbopropeller engine 12.

Moreover, the tube section 36 comprises an air outlet 48 that opens inside said cradle 10 in a plane P' substantially perpendicular to the plane P of the air inlet 44, i.e. in a substantially horizontal plane P'. As shown in FIG. 3, this air outlet 48 is intended to connect to an air inlet (not shown) of a compressor of the turbopropeller engine 12 to supply the latter with air. Thus, the inner wall 42 of the tube section 36 substantially forms a right angle between the air inlet 44 thereof and the air outlet 48 thereof.

The pipe 40 forming the particulate trap is, as has been seen, connected to the tube section 36, since the purpose thereof is to trap particles contained in the air suctioned by the air inlet duct to prevent them from being suctioned by the compressor of the turbopropeller engine 12.

To this end, the pipe 40 is connected to the inner wall 42 of the tube section 36. In particular, the pipe 40 comprises, as seen in FIGS. 7 and 8, a front end 50 that opens into the tube section 42 and at least one tubular and right-angled rear end 52, oriented outwards from the cradle 10 and oriented along a substantially horizontal axis C. Preferably, as shown in FIG. 7, the front end 50 of the pipe 40 is connected to two symmetrical tubular right-angled rear ends 52, each oriented laterally and outwards from the cradle, along two axes C that form an angle of less than 90° with the axial direction A of the turbopropeller engine 12, in order to allow the evacuation of foreign bodies and water filtered from the air flow surrounding the turbopropeller engine 12 during the forward motion of the aircraft.

This arrangement in the upper portion of the cradle 10 of the tube section 36 delimiting the air inlet duct 28 and the pipe 40 forming the particulate trap is particularly advantageous, as it allows, with respect to a conventional cradle 10, to move these elements to the upper portion of the cradle 10, where they are less likely to absorb foreign bodies and/or stagnating water present on the surface of the ground. Consequently, the filtering of the air supplying the turbopropeller engine 12 is significantly improved. Furthermore, this configuration frees up the lower portion of the cradle 10 from these elements, which facilitates access to the turbopropeller engine 12 for maintenance or disassembly operations.

Figure 5:
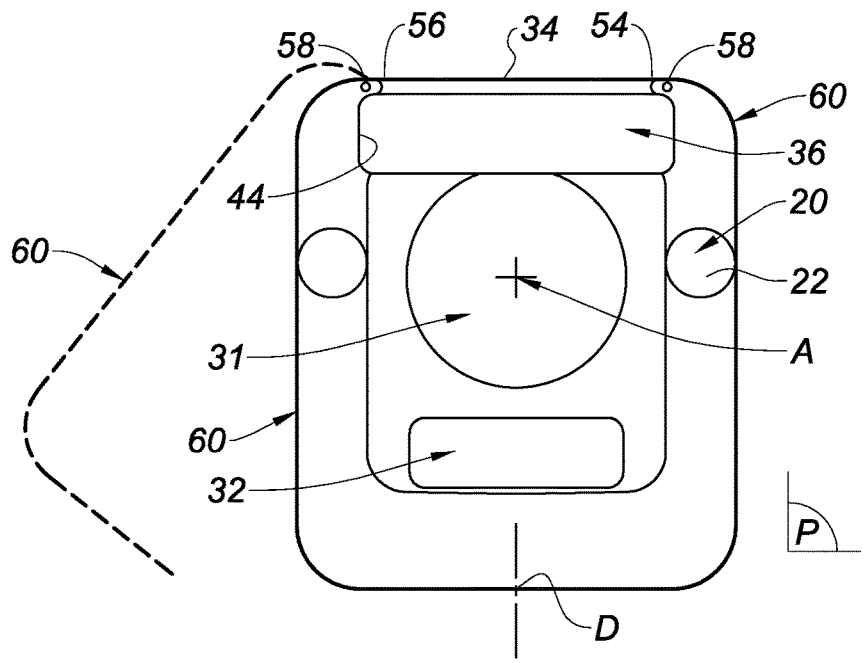
FIG. 5 is a schematic transversal cross-sectional view along plane P of FIG. 3 of the cradle and the turbopropeller engine of FIGS. 3 and 4.

Moreover, as shown in FIG. 5, the lower portion of the turbopropeller engine 12, no longer containing the air inlet duct 26 and the particulate trap, is able to receive the accessory gear box 32 in the lower part of the cradle 10, where it is no longer subject to an accumulation of hot air. This configuration improves the cooling of the members contained in this accessory gear box 32, such as an alternator and a starter of the turbopropeller engine 12, these members being particularly sensitive to heat.

Moreover, as is shown in FIGS. 6 to 8, the cradle 10 comprises two longitudinal lateral walls 54, formed of one single part with the longeron 34, these walls extending towards the rear from the front arch 16 and running along the entire length thereof of the longeron 34.

These walls 54 are connected to the unit formed by the longeron 34 of the front arch 16 and the tube section 36. Preferably, when this unit is moulded, the walls 54 are also made during the moulding operation. Advantageously, as seen in FIG. 5, the free longitudinal edges 56 of these lateral longitudinal walls 54 are configured to receive hinges 58 for the lateral protection hoods 60 of the turbopropeller engine 12, which delimit a nacelle of the turbopropeller engine 12. The hoods 60 are articulated around these hinges 58 so as to be able to be opened in a beetle-wing configuration as shown by the dotted lines in FIG. 5 relating to the hood 60 on the left side of FIG. 5, or be joined in a closed position along a longitudinal line D arranged under the cradle 10, as shown by a continuous line in FIG. 5.

Such beetle-wing hoods 60, i.e. articulated along two close or similar parallel axes formed by the hinges 58, like the forewings of a beetle, are well-known from the state of the art.

However, the lateral protection hoods 60 are, in this case, structural hoods that contribute to the rigidity of the unit formed by the cradle 10 and the hoods 60.

With respect to a cradle known from the state of the art, the cradle 10 equipped with structural hoods 60 proposed herein has increased rigidity. Therefore, it can comprise a truss 20 of rods comprising a limited number of rods, and in particular no longer comprising rods in the lower portion. Thus, as shown in FIGS. 4 and 5, the truss 20 of rods only comprises the upper lateral rods 22 secured on either side of the upper ends of said arches 16, 18, exclusive of any other rod. This configuration significantly facilitates accessibility to the lower portion of the cradle 10, and therefore the accessibility to the turbopropeller engine 12.

The cradle 10 according to the invention is therefore particularly well adapted to an aircraft power unit comprising a turbopropeller engine attached to the cradle 10 and provided with a reduction gear 31 extending at the front of the front arch 16 of said cradle 10 and under the air inlet 44 of the tube section 36, as shown in FIG. 3. In this power unit, this air inlet 44 is supplied by an air supply 46 comprising at the end thereof an air intake 28 and interposed between the front arch 16 and the propeller 30. Such a power unit can easily undergo maintenance operations relating to elements of the turbopropeller engine 12 thereof, since the equipment such as the accessory gear box 32 of the turbopropeller engine 12 can be easily disassembled and does not impede the access to the lower portion of the turbopropeller engine 12, which makes it possible for direct interventions on the turbopropeller engine 12 or the easy extraction thereof from the cradle 10.

The invention claimed is:

1. A cradle for a turboprop engine of an aircraft oriented in a substantially axial direction, comprising a front arch and a rear arch extending transversally with respect to said axial direction, said arches being open at their lower ends and connected to one another by at least one axial longeron that extends between said arches,
    wherein the longeron is arranged in the upper portion of the cradle and said longeron is monolithic with the front arch, and with at least one tubular section configured to define an air inlet duct of said turboprop engine.

2. The cradle according to claim 1, wherein the longeron is further formed of one single part with at least a part of a pipe forming a particulate trap.

3. The cradle according to claim 1, wherein the tubular section comprises an air inlet that substantially opens onto a transversal plane of said front arch.

4. The cradle according to claim 1, wherein the tubular section comprises an air outlet that opens into said cradle along a plane substantially perpendicular to the plane of the air inlet.

5. The cradle according to claim 1, wherein the cradle has two lateral rods secured on either side of the upper portions of at least one of said arches, exclusive of any other rod.

6. The cradle according to claim 2, wherein said pipe forming the particulate trap comprises a front end that opens into the tubular section and at least one tubular and right-angled rear end, oriented outwards from the cradle and oriented along a substantially horizontal axis.

7. The cradle according to claim 1, wherein said cradle further has two longitudinal lateral walls, monolithic with the longeron, said longitudinal lateral walls extending towards the rear from the front arch and running along the entire length of the longeron.

8. The cradle according to claim 7, wherein the free longitudinal edges of the longitudinal lateral walls are configured to receive hinges for lateral protection hoods of the turboprop engine.

9. An aircraft turboprop engine unit, including a turboprop engine secured to a cradle according to claim 8, and wherein the turboprop engine comprises:
    a reduction gear that extends to the front of the front arch of said cradle and under the air inlet of the tubular section of the cradle,
    an air supply of said aircraft turboprop engine unit secured to said air inlet of the cradle,
    at least one item of equipment of the turboprop engine, secured under said turboprop engine,
    two beetle-wing hoods, each hinged on an edge of the longitudinal side walls of the cradle, which are joined in a closed position along a longitudinal line (D) arranged under the cradle.

10. The aircraft turboprop engine unit according to claim 9, wherein the beetle-wing hoods are structural hoods that contribute to rigidifying said power unit.

* * * * *